United States Patent Office 2,989,493
Patented June 20, 1961

2,989,493
INK-TRANSFER COMPOSITIONS AND DUPLICATING MEDIA PREPARED THEREWITH
Ralph H. Clark, Westwood, N.J., and Ernest Walker, Toronto, Ontario, Canada, assignors to Burroughs Corporation, Detroit, Mich., a corporation of Michigan
No Drawing. Filed Dec. 14, 1956, Ser. No. 628,215
6 Claims. (Cl. 260—23)

The present invention relates to synthetic resin type of ink-transfer compositions and to inking or duplicating media prepared therewith. The invention is particularly concerned with providing novel compositions operative under pressure to release or transfer ink, an eminently suitable application therefor being in the preparation of film-forming synthetic resin type, as distinguished from wax type, coating composition for duplicating media, such as "carbon" paper.

The ink-transfer resin compositions with which the invention is concerned are of the type comprising a base of a film-forming synthetic resin which contains nonvolatile, non-drying liquid plasticizing oils sufficiently incompatible with the resin and present in sufficient quantity to migrate within the resin base, and to exude or be expressed from the resin base under pressure, and which further contains coloring matter carried by the plasticizing oils. Such compositions are frequently referred to herein as being "transfer" compositions, or coatings when applied in that form, but it will be understood that the film-forming resin does not transfer, at least in any significant amounts, under the pressure. Rather, it is the oil and coloring matter carried by the resin composition which are caused to exude or to be "squeezed" from the resin base which transfer. This is to be distinguished from the wax type compositions and coatings of the conventional carbon paper in which the wax base as well as the coloring matter transfer to the copy surface under writing or impact pressure. In "carbon" paper prepared with the synthetic resin type of ink-transfer coatings, however, the resin base remains substantially intact under the writing or impact pressure, but with every transfer or expression of oil and coloring matter from an area of the coating subjected to the pressure, the oil and coloring matter remaining in the contiguous areas of the coating tend to migrate to restore to the depleted area its transferability characteristics.

Up until the past several years the wax type of transfer coatings were almost exclusively used in the production of carbon paper. Nevertheless, transfer coating compositions of the heretofore-mentioned synthetic resin type are not of recent discovery, such compositions having been known since at least 1932 as evidenced by Australian Patent No. 10,136 of 1932. Compositions based on these early disclosed resins, however, were never successfully formulated to provide coatings having transferabiilty characteristics comparable to those of the conventional wax type coatings and were never commercialized, insofar as is known. Only in the past several years have synthetic resin type of transfer coatings been devised which were commercially practical.

However these recent compositions, as well as all the others heretofore known for this purpose, were prepared and coated on the backing media in the form of a volatile solvent solution of the resin, the solvent being subsequently evaporated. The equipment for applying the coating and evaporating the solvent is necessarily more complicated than the type of equipment used in applying the conventional wax type coatings and therefore requires a large initial installation expense. Also, the equipment is hazardous and has to be explosion-proof because of the combustible nature of the solvent, and moreover the solvent is generally lost unless further expensive recovery equipment is also utilized. Still further, since these synthetic resin type compositions include a quantity of plasticizing oils exceeding their compatibility limits with the resin base, such compositions require the backing medium, usually paper, to be first undercoated with another solvent solution of the resin to promote the adherence of the transfer coating to the medium and to minimize the penetration of the oils and color through the non-transferring surface of the medium. All the foregoing increase the cost of manufacturing transfer media prepared with these heretofore known compositions over the cost in producing the wax type media.

In addition, there are practical limitations as to the thickness of the coating that can be conveniently applied in one pass through the coating apparatus using the solvent solution type of ink-transfer coating. The coating thickness largely determines the durability or life of the transfer medium.

The present invention avoids the drawbacks and the attendant additional costs above-mentioned involved in the heretofore known synthetic resin type of ink-transfer compositions, by providing compositions which are fluid in the cold state, having no (or relatively minor amounts of) volatile ingredients; which may be coated directly without the necessity of an undercoating; which by subsequent heating and cooling are transformed into an ink-transfer material or coating having superior transferability characteristics over the wax compositions heretofore known; and which may be applied in coating thicknesses greater than practical in the resin compositions heretofore known.

A general object of the present invention is to provide novel ink-transfer compositions of the synthetic resin type which are eminently suitable for, but not limited to, application as a coating for duplicating media.

Another object is to provide such compositions which can be produced and applied to duplicating media at a cost more nearly comparable to the wax type transfer compositions but which possess superior transferability characteristics thereover.

A further object of the invention is to provide novel ink-transfer compositions of the synthetic resin type which require no, or relatively small amounts of, volatile ingredients in their preparation and application, and therefore obviate the need of hazardous and expensive explosion-proof equipment.

A further object of the invention is to provide ink-transfer compositions of the synthetic resin type which may be coated on transfer media without the necessity of first applying an undercoat.

A further object of the invention is to provide ink-transfer compositions which can be conveniently applied in coating thicknesses greater than were practical in the heretofore known synthetic resin type compositions.

A still further object of the invention is to provide ink-transfer or duplicating media prepared with the novel synthetic resin compositions.

These and other objects and advantages which will become apparent as the description proceeds are attainable by the novel ink-transfer compositions and duplicating media prepared therewith hereinafter described as illustrative examples incorporating the present invention.

As mentioned above, the compositions of the present invention are eminently suitable in preparing coating compositions for duplicating media, such as "carbon" paper. Accordingly, the compositions are hereinafter described for this particular application. These compositions enable the preparation of transfer media especially useful for pencil "carbon" applications having superior-transferability characteristics over the conventional wax type material. "Carbon" paper prepared with these compositions have superior manifolding properties, that is they are able to produce a larger number of copies simultaneously. Also, they can be produced to provide superior write-intensity and smear resistant properties over the conventional carbon papers. The compositions of the present invention exhibit less undesirable offsetting during normal handling and use of the transfer papers and are characterized by dryer and less tacky coatings, which make them cleaner to handle and enable them to produce cleaner and sharper copies. In addition, the wear properties of such coatings are much superior to the wax type and extend the life of the transfer media far over that of the wax type, which is an especially desirable property in "carbon" paper.

As distinguished from prior synthetic resin type of ink-transfer compositions wherein the resin constituent is dissolved in a solvent, the resin in the present invention is suspended in the form of a finely-divided dispersion in organic liquid vehicles, such general types of compositions being called "organosols" or "plastisols." To avoid the use of evaporating equipment, all the organic liquid vehicles in the present compositions are preferably substantially nonvolatile, in which case such compositions are generally termed "plastisols." The liquid vehicles include a compatible, solvent-type plasticizer for the resin which acts as a dispersant therefor at ordinary temperature to reduce the composition to a substantially fluid state. On heating to fuse the resin, and subsequently cooling the composition, the resin is converted to a solid state due to solvation of the dispersed resin particles by the plasticizer.

In the compositions of the present invention, the organic liquid vehicles also include a quantity of substantially nonvolatile, non-drying, liquid plasticizing oils which are sufficiently incompatible with and present in sufficient amounts so as to migrate and to exude from the resin (after it is fused) when subjected to pressure. The composition also includes coloring matter, which is carried by the plasticizing oils upon its exudation from the resin to effect the transfer.

Plastisol compositions are known which include incompatible or non-solvent type plasticizers but these are included in very small amounts as their compatibility limits are not to be exceeded, since migration or exudation of the plasticizer is not tolerated. However, in contrast to these known compositions, in the instant compositions the compatibility limits of the plasticizers are intentionally exceeded as it is this characteristic of these compositions that enables them to release or transfer the ink (i.e. the plasticizing oils carrying the coloring matter) when subjected to a writing or impact pressure.

The main resin constituent which is dispersed in the liquid vehicles is preferably of the vinyl chloride type, i.e. polyvinyl chloride or copolymers relatively high in polyvinyl chloride content, although blends with other resins, such as those containing a smaller proportion of polyvinyl chloride, may also be used. The preferred resins for the main resin constituent are polyvinyl chloride or copolymers of vinyl chloride and vinyl acetate containing 95–99% polyvinyl chloride. Minor proportions of copolyvinyl-chloride-acetate and copolyvinyl-chloride-vinylidene-chloride having a smaller proportion of vinyl chloride may be blended with the main resin. The resin constituent must be dispersed in a finely-divided form in order to obtain the necessary viscosity and flow characteristics for coating the composition on the transfer medium. It is preferred to use a vinyl chloride resin produced according to known procedures of polymerizing the monomer in an aqueous emulsion which results in the fine particle size desired.

It has also been discovered that especially desirable transferability characteristics are imparted to the coating if the main resin constituent is caused to be blended, after fusing, with other compatible resins. For this purpose some of the preferred compositions of the present invention also include, as part of the organic liquid vehicle for the vinyl resin, a quantity of a liquid heat-polymerizable material which is compatible with, but which does not solvate, the vinyl resin at ordinary temperatures and which polymerizes rapidly at the fusing temperature to form a resin blend with the vinyl resin. A number of such heat-polymerizable materials are known. Methacrylate diesters of a liquid polyethylene glycol, which have been previously used in plastisols, have been found eminently suitable in the ink-transfer compositions of the present invention. This material not only aids in dispersing the vinyl resin during mixing, but also, and probably more significant for the type of compositions of the present invention, the resin blend it forms with the vinyl resin after fusion has been found to tend to reduce the pressure sensitivity and therefore the amount of undesirable offsetting of the oils and coloring matter from the transfer coating. That is, under a writing or impact pressure applied to the fused coatings prepared therewith, there is still sufficient transfer of the oils and coloring matter to produce sharp copies, but offsetting or transfer therefrom is minimized during normal handling and use of the transfer media thereby permitting cleaner handling of the media and neater copies produced thereby. It has been found that with the other ingredients remaining constant, increasing the quantity of this material with respect to the resin content tends to decrease the amount of undesirable offsetting. The preferred maximum of this material, when included, is about one-third part by weight of the diethylene glycol dimethacrylate per part of the vinyl resin.

It has also been found that the inclusion of this material in the composition permits a decrease in the proportion of the total composition required to be of the incompatible plasticizing oils. This will be more fully apparent from the example compositions formulated in accordance with the invention to be described below.

The solvent-type plasticizers (sometimes referred to as "primary" plasticizers) included in the organic liquid vehicles must be capable of wetting and dispersing the resin at ordinary room temperatures but must not swell or dissolve them under these conditions. However, at the fusion temperature, this plasticizer must become an active solvent for the resin to solvate the resin particles, forming a solvate which is solid at normal temperatures. Many of the common plasticizers for vinyl chloride resins may be used, illustrative examples thereof including di(2-ethylhexyl) adipate, di(2-ethylhexyl)phthalate, tetrabutyl thiodisuccinate, and mixtures thereof. The proportions of such plasticizers compared to the resin can be widely varied as is well known in the art. In the specific examples set forth below, the proportions may vary from about ¼ part to about one part of the solvent-type plasticizer to one part of the vinyl resin.

The amount of the incompatable non-solvent plasticizing oils included in the composition may vary over a wide range depending on the desired characteristics of the coating, after fusion, and the specific plasticizers selected. In general, increasing the amount of these plasticizing oils will increase the write-intensity of the transfer coating. The plasticizing oils must be sufficiently incompatible with the resin for the amount included, and must remain sufficiently incompatible with the resin after the mixture is fused and cooled, so that they will migrate and exude, or be expressed from the resin coating when subjected to a writing or impact pressure. As noted above, this is what characterizes this type of coating as being an ink-transfer coating from the more conventional coating where migration and exudation of the plasticizers are not tolerated.

By "plasticizing oils" as used herein, is meant such constituents as the foregoing (whether a single one or a mixture of many, and whether normally termed "plasticizers," "softeners," "oils" or "extenders") added to the mixture for purposes of migrating and exuding from the resin after fusing as described above. These materials are frequently referred to as "secondary plasticizers" to distinguish from the primary or solvent-type plasticizers. The plasticizing oils may be selected from the substantially non-drying, nonvolatile, incompatible or partially compatible, fatty acids, esters, animal, vegetable and mineral oils. Preferred examples in each of these classes, respectively, are oleic acid; isopropyl palmitate, diglycol laurate and diglycol oleate; sperm oil; castor oil; and naphthenic mineral oil.

The plasticizing oils constituent is preferably comprised of a mixture of a plurality of such compounds. The presence of oleic acid has been found to increase the color intensity of the ink released from the fused composition. The inclusion of partially compatible esters, such as isopropyl palmitate, diglycol laurate, and diglycol oleate, has also been found to produce this effect by permitting increased pigment concentration while maintaining workable coating viscosities. Also, increased amounts of the esters increase the pressure sensitivity and therefore the write-intensity of the fused coating.

The amount of plasticizing oils included in the composition can be varied over a broad range because of the wide variation in transfer characteristics that may be desired, especially write-intensity, and because of the large choice of plasticizing oils and combinations thereof that may be selected. Also, as noted above, the inclusion of a heat-polymerizable material, such as diethylene glycol dimethacrylate, as part of the liquid carrier permits a reduction in the amount of plasticizing oils required. Normally, and in the specific examples of materials disclosed below, the liquid carrier of the resin mixture includes a quantity of the plasticizing oils which is at least as great as, and generally greater than, that of the solvent-type plasticizers. Without the heat-polymerizable material, the amount of plasticizing oils may vary from about two parts to about five parts per part of the solvent-type plasticizer, and may constitute from about 40% to about 50% of the total resin mixture. With the heat-polymerizable material present, the lower limits of the plasticizing oils may be reduced to about equal parts with respect to the solvent-type plasticizer and may constitute as low as about 25% of the total resin mixture.

As mentioned above, the coloring matter included is carried by the incompatible plasticizing oils when the latter are caused to exude from the resin base, which produces the release or transfer of ink when the coating is subjected to a writing or impact pressure. The coloring matter may be dyes soluble in the plasticizing oils or pigments suspended in the plasticizing oils. Pigments are much preferable, as oil soluble dyes have been found to have a much greater tendency for offsetting during normal handling, which is highly undesirable. The pigments should be selected for lower oil absorption properties and may be included in the composition over a somewhat broad range of proportions within workable coating viscosities. For blue inks, alkali blue or ultramarine blue pigments with suitable toners may be used.

The composition may preferably include a heat stabilizer for the vinyl chloride resin such as dibasic lead phosphite. The composition may also include minor amounts of polymerization catalyst and a polymerization inhibitor to facilitate and inhibit, respectively, the polymerization of the diethylene glycol dimethacrylate, as known in the art, but these have not been found necessary in the compositions of the specific examples to be disclosed. Also, fillers may be added to modify the properties of the fused composition. For example, bentonite and ASP Clay may be added as extenders for the pigments and as absorbents for the excess oil, thereby producing a drier finish.

Following are several examples of compositions formulated in accordance with the invention, which are presented here for illustrative purposes:

Example 1

| | Percent by wt. |
|---|---|
| Vinyl chloride resin | 32.0 |
| Di(2-ethylhexyl) adipate | 13.0 |
| Oleic acid | 5.0 |
| Alkali blue paste | 16.5 |
| Vegetable and mineral oils | 11.5 |
| Organic ester plasticizing oils | 18.0 |
| ASP Clay | 4.0 |

Example 2

| | Percent by weight |
|---|---|
| Vinyl chloride resin | 31.0 |
| Di(2-ethylhexyl) adipate | 15.0 |
| Oleic acid | 3.5 |
| Dibasic lead phosphite | 2.0 |
| Alkali blue paste | 16.5 |
| Vegetable and mineral oils | 11.5 |
| Organic ester plasticizing oils | 20.0 |
| ASP Clay | .5 |

In the above two examples, the alkali blue paste is a dispersion of about 40% of alkali blue pigment in about 60% of mineral oil. The di(2-ethylhexyl) adipate is the liquid solvent-type plasticizer which solvates the vinyl chloride resin particles when the mixture is heated to the fusing temperature, as described above. The ASP Clay is an absorbent clay (300 mesh) filler added to the mixture and serves as an extender for the pigments and as an absorbent for the excess oil which produces a drier finish when the mixture is fused. Example 2 includes a minor amount of dibasic lead phosphite which acts as a heat stabilizer for the vinyl chloride resin, inhibiting blistering of the coating during fusing.

The remaining constituents of these compositions are nondrying nonvolatile, liquid plasticizing oils as hereinabove described, and are sufficiently incompatible with the resin after fusing and are present in sufficient quantity so that these oils migrate within the resin and are exuded or expressed from the resin base, after fusing, under a writing or impact pressure. It will be noted that each of the above two compositions includes a mixture of oleic acid, vegetable (e.g. castor) oils and mineral oils, and organic ester plasticizing oils such as one or more of isopropyl palmitate, diglycol laurate, or diglycol oleate.

In both of the above examples, it will be noted that the plasticizing oils together far exceed the amount of the solvent-type plasticizer. Including the mineral oil of the alkali blue paste (which is about 60% thereof), the amount of plasticizing oils in Example 1 is about 3½ times the amount of the solvent-type plasticizer, and in Example 2 is about 3 times the amount of the solvent-type plasticizer. It will be appreciated that these proportions can be somewhat varied for any particular transferability characteristics. Considering the specific ingredients of Example 2 the organic esters can be increased to about 23 parts and the solvent-type plasticizer can be decreased to about 12 parts, whereby the total plasticizing oils present would constitute about four times the solvent-type plasticizer. Any further increase in the amount of plasticizing oils in these specific examples would tend to produce smudgy coatings. The amount of plasticizing oils is preferably about 40% to about 50% of the total resin mixture in the type of formulations illustrated by the foregoing examples.

It will be noted that the foregoing examples do not include the heat-polymerizable liquid which polymerizes at the fusing temperature and blends with the vinyl resin. Following are several further examples including the heat-polymerizable diethylene glycol dimethacrylate as part of the organic liquid vehicle for the resin dispersion. In the examples below using the heat-polymerizable material, the amount of plasticizing oils may be reduced to about equal parts with respect to the solvent-type plasticizer and may constitute as low as about 25% of the total resin mixture.

|  | Example 3, Percent by wt. | Example 4, Percent by wt. | Example 5, Percent by wt. |
|---|---|---|---|
| Vinyl Chloride Resin | 31 | 32 | 27.5 |
| Di(2-ethylhexyl) Adipate | 24 | 26 | 22 |
| Diethylene Glycol Dimethacrylate | 6 | 6.5 | 5.5 |
| Oleic Acid | 3 | 2.5 | 4 |
| Alkali Blue Paste | 17.5 | 16 | 20 |
| Vegetable and Mineral Oils | 12 | 11 | 14 |
| Organic Ester Plasticizing Oils | 5 | 5 | 6 |
| ASP Clay | 1 | 1 | 1 |

Example 3 illustrates a typical formulation which includes the heat-polymerizable material, and Examples 4 and 5 illustrate how the proportions, especially of the plasticizing oils, may vary. In Example 4 the amount of plasticizing oils, being slightly over the amount of the solvent-type plasticizer, approaches its minimum for the specific materials disclosed and for the relative amount of the heat-polymerizable material included; and in Example 5 the amount of the plasticizing oils approaches its maximum.

In the above Examples 3, 4 and 5, the total vegetable and mineral oil constituents (inclusive of the mineral oil in the alkali blue paste) may be castor oil and the mineral oil in about equal parts. The organic ester plasticizing oils may be about equal parts of isopropyl palmitate and diglycol laurate. The vinyl chloride resin is preferably one containing at least 95% polyvinyl chloride prepared by polymerizing the monomer in an aqueous emulsion as mentioned above.

In preparing the foregoing compositions, the coloring matter and the oils, except the organic ester plasticizing oils, are preferably pre-mixed in a roller mill until the pigments are well dispersed. The vinyl resin in the form of finely-divided particles, the solvent-type plasticizers, the organic ester plasticizing oils, and the diethylene glycol dimethacrylate (if included) are also pre-mixed preferably in a pebble mill. The two are then combined and mixed in a high speed mixer until the resin particles are well dispersed throughout the liquid vehicles. Where the resulting composition is to be utilized as an ink-transfer coating on a backing medium, such as paper, it may be applied by any suitable coating apparatus, such as by a doctoring roll in a reverse roll type of coating machine. Alternatively, the coating composition may be applied by means of a pressure-type applicator, such as disclosed in U.S. Patent No. 2,766,717. Especially the latter type applicator permits the application of coatings of the compositions disclosed having greater thicknesses than the solvent-type heretofore known. The fluid composition is fused immediately after coating, by heating it to a temperature sufficiently high for the solvent-type plasticizer to solvate the resin particles. Fusion may be accomplished by passing the coated paper over a roll heated to a temperature of about 175° C. to about 205° C., or by the use of infra-red lamps. As mentioned above, the heating of the mixture to the fusion temperature also polymerizes the diethylene glycol dimethacrylate which blends with the vinyl chloride resin to form a solid resin base, upon cooling, for the liquid plasticizing oils and coloring matter.

While the compositions of the present invention have been described for preparing coating compositions for duplicating media such as paper, this being an eminently suitable application therefor, it will be appreciated that such compositions are not limited to this application but may be used for preparing many other types of ink-transfer or ink-releasing compositions, such as self-supporting solid articles as ink pads and the like. Many modifications, variations and equivalents of the compositions herein disclosed for illustrative purposes will be readily apparent to those skilled in the synthetic resin art and are intended to be included in the scope of the invention as defined in the following claims.

We claim:

1. An ink-transfer composition operative under pressure to express liquid ink from a solid synthetic resin, said composition comprising the fused product of a uniform mixture of finely-divided polyvinyl chloride resin particles dispersed in liquid organic vehicles containing coloring matter; said liquid vehicles including a plasticizer operative to solvate the resin particles upon heating the mixture to the resin fusing temperature, a methacrylate diester of a liquid polyethylene glycol operative to polymerize when heated to the fusing temperature and to blend with the polyvinyl chloride resin, and an organic liquid which is substantially non-drying, substantially non-volatile at normal room temperatures, and sufficiently incompatible with and present in sufficient quantity to migrate and to be expressible from the fused resin under pressure; said coloring matter being carried by said non-volatile, non-drying liquid for expression therewith under pressure.

2. An ink-transfer composition operative under pressure to express liquid ink from a solid synthetic resin, said composition comprising the fused product of a uniform mixture of finely-divided polyvinyl chloride resin particles dispersed in liquid organic vehicles containing coloring matter; said liquid vehicles including a plasticizer operative to solvate the resin particles upon heating the mixture to the resin fusing temperature, a methacrylate diester of a liquid polyethylene glycol operative to polymerize when heated to the fusing temperature and to blend with the polyvinyl chloride resin, and a mixture of nonvolatile, non-drying liquids including at least one ester selected from the group consisting of isopropyl palmitate, diglycol laurate, and diglycol oleate; said nonvolatile, non-drying liquids being sufficiently incompatible with and present in sufficient quantity to migrate and to be expressible from the fused resin under pressure; said coloring matter being carried by said nonvolatile, non-drying liquids for expression therewith under pressure.

3. An ink-transfer composition operative under pressure to express liquid ink from a solid synthetic resin, said composition comprising the fused product of a uniform mixture of finely-divided polyvinyl chloride resin particles dispersed in liquid organic vehicles containing coloring matter; said liquid vehicles including a plasticizer operative to solvate the resin particles upon heating the mixture to the resin fusing temperature, diethylene glycol dimethacrylate operative to polymerize when heated to the fusing temperature and to blend with the polyvinyl chloride resin, and a mixture of nonvolatile, non-drying liquids comprising oleic acid and at least one ester selected from the group consisting of isopropyl palmitate, diglycol laurate, and diglycol oleate; said nonvolatile, non-drying liquids being present from one to five parts by weight per part of said plasticizer and being sufficiently incompatible with and present in sufficient quantity to migrate and to be expressible from the fused resin under pressure; said coloring matter being carried by said nonvolatile, non-drying liquids for expression therewith under pressure.

4. A duplicating article such as carbon paper and the like comprising a backing member capable of transmitting an impression; a synthetic resin ink-transfer coating carried thereby operative by pressure to express liquid ink and to thereby transfer an impression to a copy-receiving surface; said coating comprising the fused product of a uniform mixture of finely-divided polyvinyl chloride resin particles dispersed in liquid organic vehicles containing coloring matter; said liquid vehicles including a plasticizer operative to solvate the resin particles upon heating the mixture to the resin fusing temperature, a methacrylate diester of a liquid polyethylene glycol operative to polymerize when heated to the fusing temperature and to blend with the polyvinyl chloride resin, and an organic liquid which is substantially non-drying, substantially nonvolatile at normal room temperatures, and sufficiently incompatible with and present in sufficient quantity to migrate and to be expressible from the fused resin under pressure; said coloring matter being carried by said nonvolatile, non-drying liquid for expression therewith under pressure.

5. A duplicating article such as carbon paper and the like comprising a backing member capable of transmitting an impression; a synthetic resin ink-transfer coating carried thereby operative by pressure to express liquid ink and to thereby transfer an impression to a copy-receiving surface; said coating comprising the fused product of a uniform mixture of finely-divided polyvinyl chloride resin particles dispersed in liquid organic vehicles containing coloring matter; said liquid vehicles including a plasticizer operative to solvate the resin particles upon heating the mixture to the resin fusing temperature, a methacrylate diester of a liquid polyethylene glycol operative to polymerize when heated to the fusing temperature and to blend with the polyvinyl chloride resin, and a mixture of nonvolatile, non-drying liquids including at least one ester selected from the group consisting of isopropyl palmitate, diglycol laurate, and diglycol oleate; said nonvolatile, non-drying liquids being sufficiently incompatible with and present in sufficient quantity to migrate and to be expressible from the fused resin under pressure; said coloring matter being carried by said nonvolatile, non-drying liquids for expression therewith under pressure.

6. A duplicating article such as carbon paper and the like comprising a backing member capable of transmitting an impression; a synthetic resin ink-transfer coating carried thereby operative by pressure to express liquid ink and to thereby transfer an impression to a copy-receiving surface; said coating comprising the fused product of a uniform mixture of finely-divided polyvinyl chloride resin particles dispersed in liquid organic vehicles containing coloring matter; said liquid vehicles including a plasticizer operative to solvate the resin particles upon heating the mixture to the resin fusing temperature, diethylene glycol dimethacrylate operative to polymerize at the fusing temperature and to blend with the polyvinyl chloride resin, and a mixture of nonvolatile, non-drying liquids comprising oleic acid, castor oil, and at least one ester selected from the group consisting of isopropyl palmitate, diglycol laurate, and diglycol oleate; said nonvolatile, non-drying liquids being present from one to five parts by weight per part of said plasticizer and being sufficiently incompatible with and present in sufficient quantity to migrate and to be expressible from the fused resin under pressure; said coloring matter being carried by said nonvolatile, non-drying liquids for expression therewith under pressure.

References Cited in the file of this patent

UNITED STATES PATENTS

| | | |
|---|---|---|
| 1,830,980 | Carr | Nov. 10, 1931 |
| 2,084,386 | Crawford | June 22, 1937 |
| 2,097,754 | Bradshaw | Nov. 2, 1937 |
| 2,153,324 | Bjorksten | Apr. 4, 1939 |
| 2,413,259 | Soday | Dec. 24, 1946 |
| 2,618,621 | Burt | Nov. 18, 1952 |
| 2,777,824 | Leeds | Jan. 15, 1954 |
| 2,713,006 | Hunter | July 12, 1955 |
| 2,801,661 | Newman et al. | Oct. 22, 1957 |
| 2,820,717 | Newman | Jan. 21, 1958 |
| 2,893,890 | Harvey | July 7, 1959 |

FOREIGN PATENTS

| | | |
|---|---|---|
| 392,220 | Great Britain | May 15, 1933 |
| 278,953 | Sweden | Nov. 15, 1949 |

OTHER REFERENCES

Buttrey: Plasticizers, pages 80–81, Cleaver-Home Press (London), 2d edition (1947).

Partridge et al.: Rubber Age, pp. 553–560, vol. 67, No. 5 (August 1950).

Clark et al.: Rubber Age, pp. 343–396, vol. 72, No. 3 (December 1952).